No. 773,346. Patented October 25, 1904.

UNITED STATES PATENT OFFICE.

ALBRECHT SCHMIDT AND OTTO RHODIUS, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

YELLOW SULFUR DYE AND PROCESS OF MAKING SAME.

SPECIFICATION forming part of Letters Patent No. 773,346, dated October 25, 1904.

Application filed June 23, 1904. Serial No. 213,759. (No specimens.)

*To all whom it may concern:*

Be it known that we, ALBRECHT SCHMIDT, Ph. D., and OTTO RHODIUS, Ph. D., chemists, citizens of the Empire of Germany, residing at Höchst-on-the-Main, Germany, have invented certain new and useful Improvements in the Manufacture of Yellow Sulfurized Dyestuffs, of which the following is a specification.

We have found that yellow dyestuffs of great purity and fastness may be obtained if the products of reaction of carbon bisulfid on metatoluylenediamin are heated with sulfur at, for instance, 190° to 220° centigrade in presence of aromatic amins, such as benzidin or similarly-acting bases, and the products thus obtained are dissolved in alkali sulfids.

Example: Into one hundred and eighty parts, by weight, of melted sulfur is introduced at about 110° to 130° centigrade a mixture of thirty parts, by weight, of benzidin and the product of reaction of one molecular proportion of carbon bisulfid on one molecular proportion of metatoluylenediamin. The whole is then heated for some hours to about 190° to 220° centigrade until a test portion treated with sodium sulfid has the desired shade and fastness. The sulfurized product thus obtained is a brown powder insoluble in water, alcohol, ether, and benzene, soluble in hot alkali sulfids. One hundred parts, by weight, of this product are introduced into two hundred and twenty-five parts, by weight, of melted sodium sulfid. The temperature is gradually raised while stirring, and the mass is dried, preferably, in a vacuum.

The product dyes cotton a beautiful pure yellow of great fastness. It is readily soluble in water and alcohol, and the free acid of the dyestuff is easily obtained by means of the usual precipitants. By modifying the temperature and time when sulfurizing the shade assumes a more or less red tint.

Having now described our invention, what we claim is—

1. The herein-described process for the manufacture of yellow dyestuffs of great purity, which consists in heating at a high temperature the products of reaction of carbon bisulfid on metatoluylenediamin in presence of aromatic bases and in fusing the sulfurized products thus obtained with alkali sulfids.

2. As a new product, the pure yellow dyestuff obtained by heating the products of reaction of carbon bisulfid on metatoluylenediamin with sulfur in presence of aromatic amins, being a brown powder, insoluble in water, alcohol, ether and benzene, soluble in hot alkali sulfids.

In testimony that we claim the foregoing as our invention we have signed our names in presence of two subscribing witnesses.

ALBRECHT SCHMIDT.
OTTO RHODIUS.

Witnesses:
  ALFRED BRISBOIS,
  BERNHARD LEYDECKER.